(12) United States Patent
Tanaka et al.

(10) Patent No.: US 8,119,244 B2
(45) Date of Patent: Feb. 21, 2012

(54) ACTIVE ENERGY RAY-CURABLE RESIN COMPOSITION AND LAMINATE THEREOF

(75) Inventors: Kazushi Tanaka, Tokyo (JP); Kenji Yoneyama, Sagamihara (JP); Toshifumi Midorikawa, Tokyo (JP); Takashi Nishio, Tokyo (JP)

(73) Assignee: TDK Corporation, Tokyo (JP)

( * ) Notice: Subject to any disclaimer, the term of this patent is extended or adjusted under 35 U.S.C. 154(b) by 643 days.

(21) Appl. No.: 12/285,823

(22) Filed: Oct. 15, 2008

(65) Prior Publication Data
US 2009/0130453 A1    May 21, 2009

(30) Foreign Application Priority Data

Oct. 18, 2007   (JP) ................. 2007-271595

(51) Int. Cl.
  *B32B 27/00*   (2006.01)
  *C08L 83/06*   (2006.01)
  *C08K 3/22*    (2006.01)
(52) U.S. Cl. ........ 428/422; 428/447; 524/409; 524/430; 524/588
(58) Field of Classification Search ............ 524/588
  See application file for complete search history.

(56) References Cited

U.S. PATENT DOCUMENTS

| | | | |
|---|---|---|---|
| 4,378,250 A * | 3/1983 | Treadway et al. | 106/287.11 |
| 5,785,892 A | 7/1998 | Nishida et al. | |
| 6,660,388 B2 * | 12/2003 | Liu et al. | 428/421 |
| 6,841,190 B2 * | 1/2005 | Liu et al. | 427/64 |
| 2004/0081764 A1 * | 4/2004 | Liu et al. | 427/376.1 |
| 2004/0218511 A1 | 11/2004 | Kondo et al. | |
| 2005/0171318 A1 * | 8/2005 | Okuhira et al. | 528/34 |

(Continued)

FOREIGN PATENT DOCUMENTS

CN    1871275    11/2006

(Continued)

OTHER PUBLICATIONS

An Office Action issued Feb. 12, 2010 in corresponding Chinese Application No. 200810166688.5 (with English translation).

(Continued)

*Primary Examiner* — Robert Loewe
(74) *Attorney, Agent, or Firm* — Wenderoth, Lind & Ponack, L.L.P.

(57) ABSTRACT

An active energy ray-curable resin composition comprises a compound (A) having an active energy ray-curable unsaturated bond in a molecule, an anti-staining property-imparting agent (B) which is a fluorine-containing polyether compound having a perfluoropolyether unit, a urethane bond and an active energy ray-curable unsaturated bond in a molecule, a compound (C) represented by the general formula (I):

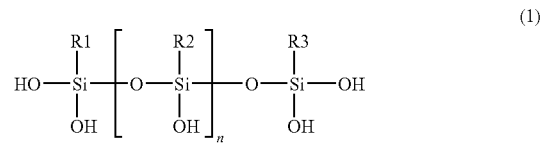

wherein R1, R2 and R3 may be either the same or different, and are respectively an organic group having at least one functional group selected from the group consisting of a vinyl group, an epoxy group, a (meth)acryloxy group, an amino group and a mercapto group, and n is an integer of 0 or more; and inorganic fine particles (D).

6 Claims, 2 Drawing Sheets

U.S. PATENT DOCUMENTS

| | | |
|---|---|---|
| 2007/0148596 A1 | 6/2007 | Hayashida et al. |
| 2007/0275171 A1* | 11/2007 | Dang et al. .................... 427/384 |
| 2007/0285778 A1* | 12/2007 | Walker et al. ................ 359/488 |

FOREIGN PATENT DOCUMENTS

| | | |
|---|---|---|
| JP | 2506065 | 4/1996 |
| JP | 2003-173575 | 6/2003 |
| JP | 2003-187497 | 7/2003 |
| JP | 2003-196883 | 7/2003 |
| JP | 2005-126453 | 5/2005 |

OTHER PUBLICATIONS

Xing Songmin Xing et al., "Synthesis and Application of organic silicon", pp. 371-372 and 383, Chemical Industry Press, Sep. 2009, First Edition, First Print.

* cited by examiner

ACTIVE ENERGY RAY-CURABLE RESIN COMPOSITION AND LAMINATE THEREOF

BACKGROUND OF THE INVENTION

1. Field of the Invention

The present invention relates to an active energy ray-curable resin composition capable of imparting scratch resistance, antistatic property and anti-staining property to surfaces of, for example, functional optical films such as anti-reflection films and near-infrared ray absorbing films on surfaces of optical information media such as read-only optical disks, optical recording disks and magneto-optical recording disks, and liquid crystal displays and plasma displays. Furthermore, the present invention relates to a laminate having a hard coat layer formed from the active energy ray-curable resin composition on a substrate.

2. Disclosure of the Related Art

Recently, optical recording devices, which are capable of recording a large capacity of data at a high density and quickly recording and reproducing data, have come to attract attention with development of multimedia. Such optical recording devices include devices which reproduce read-only disks such as CDs and laser disks, in which information is stamped thereon during the disk production and which are capable of only reproducing information; devices which record and reproduce write-once disks such as a CD-R, which are capable of recording only once; and devices which reproduce and record rewritable disks, in which data can be rewritten and erased any number of times by using the magneto-optical recording system or the phase-change recording system. In such optical recording devices, reproducing and recording of data are performed by the use of a light spot obtained by focusing laser light to the diffraction limit with a lens.

In order to record information at a higher density, in other words, to form smaller bit patterns on an optical information medium, it is necessary to make a laser light spot smaller. There are two possible methods for making a size of a light spot smaller, namely, a method of reducing the laser light wavelength (λ) and a method of increasing the numerical aperture (NA) of the lens. While the wavelength of the laser light currently used for optical disks is mainly from about 780 nm to about 650 nm, use of blue laser light or the like having further shorter wavelength have increasingly been investigated.

As to the system which uses blue laser light, the minimum bit length has been reduced to about 0.14 μm by adjusting the wavelength of the light source to 405 nm, the NA to 0.85, and the track pitch to 0.32 μm. Thereby, blu-ray disks having a recording capacity as large as 4 times or more that of a DVD have been commercialized. However, when the wavelength of a light source is reduced or the NA of an objective lens is increased, the focal length of light becomes shorter. A lens having a higher NA produces blur or aberration more easily. Furthermore, it becomes severer to control of the amount of substrate distortion (tilt) with which the surface of an optical disk inclines from the right angle relative to the optical axis, or of the unevenness in thickness of optical disks.

Therefore, a data is recorded or reproduced by irradiating laser light converged through a lens having a specific numerical aperture to a recording layer through a 1.2 mm thick polycarbonate substrate surface in conventional CDs, or through a 0.6 mm thick substrate in DVDs having two 0.6 mm thick polycarbonate substrates laminated. Conversely, in the case of using blue laser light, a system is used in which a recording layer is formed on a polycarbonate substrate and further a thin-film cover layer of about 0.1 mm in thickness is formed thereon, and data are read by irradiating blue laser light to the thin-film cover layer surface.

The thin-film cover layer is composed of a light transmitting layer which protects the recording layer directly and a hard coat layer for protecting the whole disk surface. The light transmitting layer is formed by a method in which an active energy ray-curable resin is applied onto the surface of the recording layer to spread uniformly by a spin coating method or the like, or a method in which films are laminated. A hard coat layer is formed by applying an active energy ray-curable resin composition and then spreading it uniformly by a spin coating method or the like. While a hard coat layer is formed for the purpose of preventing scratching or adhering of dust or stain such as fingerprint, which will cause errors during recording and reproducing, these properties are extremely important particularly in use of blue laser light.

On the other hand, a hard coat layer which is formed on a surface of a functional optical film to be used for the surface of a liquid crystal or plasma display is required to have excellent property in, for example, hardness, transparency, antistatic property for preventing dust due to static electricity from adhering, and the property of preventing adhesion of stains such as fingerprint, depending on its intended use. Various components are used depending upon the property. These functional optical films are formed in a single layer structure or a multilayer structure on a transparent film of a resin such as polyethylene terephthalate (PET), polycarbonate (PC), polymethyl methacrylate (PMMA) or triacetyl cellulose (TAC). Moreover, such films are required to be transparent and uniform films free of birefringence because of their properties.

Conventionally, fluorine monomers have been added to a compound having an active energy ray-curable unsaturated bond for the purpose of preventing stains such as fingerprint from adhering to a hard coat layer. In addition, in order to prevent scratching or dust adhesion, addition of silica fine particles or fine particles of a metal oxide such as tin oxide-doped indium oxide (ITO) or tin oxide-doped antimony oxide (ATO), addition of fine particles obtained by modifying the surface of such fine particles with a hydrolyzable silane compound, and addition of a quaternary ammonium salt have been performed.

Patent Document 1: JP-A-2003-196883
Patent Document 2: JP-A-2005-126453
Patent Document 3: Japanese Patent No. 2506065

SUMMARY OF THE INVENTION

When an active energy ray-curable resin composition containing these components is applied onto a supporting substrate, the smoothness of a coating film is readily impaired, and therefore defects in appearance and additionally decrease in accuracy of reading optical information media are caused, resulting in serious quality problems.

An object of the present invention is to provide an active energy ray-curable resin composition capable of forming a hard coat layer which is excellent in durability of scratch resistance, dust resistance, anti-staining property and the like and which is excellent in surface smoothness at the time of application, and to provide a laminate having, on a substrate, a hard coat layer formed from the active energy ray-curable resin composition.

A first aspect of the present invention is an active energy ray-curable resin composition comprising:
a compound (A) having an active energy ray-curable unsaturated bond in a molecule, a anti-staining property-imparting agent (B) which is a fluorine-containing polyether compound having a perfluoropolyether unit, a urethane bond and an active energy ray-curable unsaturated bond in a molecule, a compound (C) represented by the general formula (1):

wherein R1, R2 and R3 may be either the same or different, and are respectively an organic group having at least one functional group selected from the group consisting of a vinyl group, an epoxy group, a (meth)acryloxy group, an amino group and a mercapto group, and n is an integer of 0 or more, and inorganic fine particles (D).

A second aspect of the present invention is the above-described active energy ray-curable resin composition, wherein the compound (C) has a weight-average molecular weight of 5,000 to 800,000 in terms of polystyrene, determined by GPC.

A third aspect of the present invention is the above-described active energy ray-curable resin composition, wherein the compound (C) is contained in an amount of 1% by weight to 10% by weight in 100% by weight of nonvolatile components in the active energy ray-curable resin composition.

A fourth aspect of the present invention is the above-described active energy ray-curable resin composition, wherein the inorganic fine particles (D) are at least one kind of fine particles selected from the group consisting of metal oxide fine particles containing at least one element selected from the group consisting of antimony, indium and tin, and silica fine particles.

A fifth aspect of the present invention is the above-described active energy ray-curable resin composition, wherein the inorganic fine particles (D) have an average particle diameter of from 5 to 100 nm as measured by a dynamic light scattering method, and are contained in an amount of 20% by weight to 80% by weight in 100% by weight of nonvolatile components in the active energy ray-curable resin composition.

A sixth aspect of the present invention is a laminate comprising:
a supporting substrate; and
a hard coat layer formed from the above-described active energy ray-curable resin composition, on the supporting substrate.

The present invention makes it possible to provide an active energy ray-curable resin composition capable of forming a hard coat layer which is excellent in durability of scratch resistance, dust resistance, anti-staining property and the like and which is excellent in surface smoothness at the time of application, and to provide a laminate having a hard coat layer formed from the active energy ray-curable resin composition.

DETAILED DESCRIPTION OF THE INVENTION

The present invention will be described in detail below.

As the compound (A) having an active energy ray-curable unsaturated bond in each molecule contained in the active energy ray-curable resin composition of the present invention, a radical polymerizable monomer is used. Examples of the radical polymerizable monomer include a polyfunctional monomer having a functionality of 2 or more and having an unsaturated double bond in a molecule and/or a mono-functional monomer having an unsaturated double bond in a molecule. Examples of these monomers include radical polymerizable monomers such as vinyl type monomers, allyl type monomers, acrylate type or methacrylate type (henceforth, referred to as (meth)acrylate type) monomers. Such monomers having an unsaturated double bond may have a functional group. One kind of the radical polymerizable monomer may be used, and two or more kinds of monomers may be used in combination in order to control the crosslink density.

Substances which can be used as the component (A) include relatively low-molecular weight compounds having a molecular weight of, for example, less than 1,000, which are "monomers" in a narrow sense, and compounds having a relatively large molecular weight, for example, oligomers or prepolymers having a weight-average molecular weight of 1,000 or more and less than 10,000. Examples of oligomers having an unsaturated double bond include polyester (meth) acrylate, polyurethane (meth)acrylate, epoxy (meth)acrylate, and (meth)acrylated maleic acid-modified polybutadiene.

Examples of the vinyl type monomer include styrene, α-methylstyrene, divinylbenzene, N-vinylpyrrolidone, vinyl acetate, N-vinylformaldehyde, N-vinylcaprolactam and alkyl vinyl ether. Examples of the allyl type monomer include triallyl cyanurate.

Specific examples of the monofunctional (meth)acrylate monomer include 2-(meth)acryloyloxyethyl phthalate, 2-(meth)acryloyloxyethyl-2-hydroxyethyl phthalate, 2-(meth)acryloyloxyethyl hexahydrophthalate, 2-(meth) acryloyloxypropyl phthalate, 2-ethylhexyl (meth)acrylate, 2-ethylhexylcarbitol (meth)acrylate, 2-hydroxybutyl (meth) acrylate, 2-hydroxyethyl (meth)acrylate, 2-hydroxypropyl (meth)acrylate, 2-methoxyethyl (meth)acrylate, 3-methoxybutyl (meth)acrylate, 4-hydroxybutyl (meth)acrylate, benzyl (meth)acrylate, butanediol mono(meth)acrylate, butoxyethyl (meth)acrylate, butyl (meth)acrylate, caprolactone (meth) acrylate, cetyl (meth)acrylate, cresol (meth)acrylate, cyclohexyl (meth)acrylate, dicyclopentanyl (meth)acrylate, dicyclopentenyl (meth)acrylate, dicyclopentenyloxyethyl (meth) acrylate, diethylene glycol monoethyl ether (meth)acrylate, dimethylaminoethyl (meth)acrylate, dipropylene glycol (meth)acrylate, phenyl (meth)acrylate, ethyl (meth)acrylate, isoamyl (meth)acrylate, isobornyl (meth)acrylate, isobutyl (meth)acrylate, isodecyl (meth)acrylate, isooctyl (meth)acrylate, isostearyl (meth)acrylate, isomyristyl (meth)acrylate, lauroxy polyethylene glycol (meth)acrylate, lauryl (meth)acrylate, methoxydipropylene glycol (meth)acrylate, methoxytripropylene glycol (meth)acrylate, methoxypolyethylene glycol (meth)acrylate, methoxytriethylene glycol (meth)acrylate, methyl (meth)acrylate, neopentyl glycol benzoate (meth)acrylate, nonylphenoxy polyethylene glycol (meth)acrylate, nonylphenoxy polypropylene glycol (meth)acrylate, octafluoropentyl (meth)acrylate, octoxy polyethylene glycol-polypropylene glycol (meth)acrylate, octyl (meth)acrylate, paracumylphenoxyethylene glycol (meth)acrylate, perfluorooctylethyl (meth)acrylate, phenoxy (meth)acrylate, phenoxydiethylene glycol (meth)acrylate, phenoxyethyl (meth)acrylate, phenoxyhexaethylene glycol (meth)acrylate, phenoxytetraethylene glycol (meth)acrylate, polyethylene glycol (meth)acrylate, stearyl (meth)acrylate, succinic acid (meth)acrylate, t-butyl (meth)acrylate, t-butyl cyclohexyl (meth)acrylate, tetrafluoropropyl (meth)acrylate, tetrahydrofurfuryl (meth)acrylate, tribromophenyl (meth)acrylate, tridecyl (meth)acrylate, trifluoroethyl (meth)acrylate, β-carboxyethyl (meth)acrylate, ω-carboxy-polycaprolactone (meth)acrylate, and derivatives and modification products thereof.

Specific examples of the polyfunctional (meth)acrylate monomer include 1,3-butylene glycol di(meth)acrylate, 1,4-butanediol di(meth)acrylate, 1,6-hexanediol di (meth)acrylate, 1,9-nonanediol di (meth)acrylate, bisphenol A di(meth)acrylate, bisphenol F di(meth)acrylate, diethylene glycol di(meth)acrylate, hexahydrophthalic acid di(meth)acrylate, hydroxypivalic acid neopentyl glycol di(meth)acrylate, neopentyl glycol di(meth)acrylate, hydroxypivalic acid ester neopentyl glycol di(meth)acrylate, pentaerythritol di(meth)acrylate, phthalic acid di(meth)acrylate, polyethylene glycol di(meth)acrylate, polypropylene glycol di(meth)acrylate, polytetramethylene glycol di(meth)acrylate, bisphenol A diglycidyl ether di(meth)acrylate, triethylene glycol di(meth)acrylate, tetraethylene glycol di(meth)acrylate, tricyclodecanedimethanol di(meth)acrylate, dimethyldicyclopentane di(meth)acrylate, neopentyl glycol-modified trimethylolpropane di(meth)acrylate, tripropylene glycol di(meth)acrylate, triglycerol di(meth)acrylate, dipropylene glycol di(meth)acrylate, glycerol tri(meth)acrylate, pentaerythritol tri(meth)acrylate, phosphoric acid tri(meth)acrylate, trimethylolpropane tri(meth)acrylate, trimethylolpropane benzoate tri (meth)acrylate, tris((meth)acryloxyethyl) isocyanurate, di(meth)acrylated isocyanurate, dipentaerythritol hexa (meth)acrylate, dipentaerythritol hydroxypenta(meth)acrylate, ditrimethylolpropane tetra(meth)acrylate, pentaerythritol tetra(meth)acrylate, and derivatives and modification products thereof.

As the compound (A) having an active energy ray-curable unsaturated bond in a molecule, a combination of a bi- or tri-functional monomer such as tripropylene glycol diacrylate or trimethylolpropane triacrylate and a penta- or hexa-functional monomer such as dipentaerythritol hexaacrylate or dipentaerythritol pentaacrylate is preferred from the viewpoint of keeping the coating film hardness. It is more preferable to further combine polyurethane (meth)acrylate in order to impart flexibility. The blended amounts of these ingredients preferably are 0 to 30% by weight for the bi- or tri-functional monomer, 2 to 50% by weight for the penta- or hexa-functional monomer, and 0 to 20% by weight for polyurethane (meth)acrylate.

Next, the anti-staining property-imparting agent (B) which is a fluorine-containing polyether compound in the present invention is a compound having at least one perfluoropolyether unit, at least one urethane bond, and at least one active energy ray-curable unsaturated bond. Perfluoropolyether moieties are apt to gather to the surface of a hard coat layer more in comparison to fluorinated alkyl moieties of fluorinated alkyl (meth)acrylate, so that it imparts an excellent water repellency and oil repellency, and/or excellent lubricity. On the other hand, since the agent (B) has an active energy ray-reactive group, a crosslinking reaction between fluorine-containing polyether compounds (B), or a copolymerization reaction with the compound (A) having an active energy ray-curable unsaturated bond is caused by irradiation with an active energy ray when curing a hard coat agent. This makes it possible to fix the agent (B) in a hard coat layer. As a result, a hard coat layer which can exhibit excellent anti-staining property and excellent lubricity under various storage conditions and use conditions is formed.

The fluorine-containing polyether compound (B) preferably has the number average molecular weight (Mn) from 500 or greater to 10,000 or lower in terms of polystyrene determined by GPC. Use of the compound (B) having this range of the number average molecular weight makes it possible to impart a desired water repellency and oil repellency, and/or lubricity to the hard coat layer surface, ensuring compatibility with other monomer and oligomer components in the active energy ray-curable resin composition.

It is preferable that the fluorine-containing polyether compound (B) has 2 or more active energy ray-curable unsaturated bonds in the molecule because such a compound is able to further improve the fixation into the hard coat layer and also improve the anti-staining property and lubricity. It is preferable that the fluorine-containing polyether compound (B) has an active energy ray-curable unsaturated bond on both ends of the molecule respectively, because such a compound is able to further improve the fixation into the hard coat layer, and it is more preferable that the compound (B) has two or more active energy ray-curable unsaturated bonds on both ends of the molecule respectively. An increased fixation into the hard coat layer will provide a hard coat layer extremely excellent in solvent resistance.

The fluorine-containing polyether compound (B) is based on a fluorine-containing polyether compound having a hydroxyl group and perfluoropolyether unit at the ends, wherein a (meth) acryloyl group is introduced via urethane bond into the hydroxyl group. Fluorine-containing polyether compounds as a raw material include the following compounds but are not restricted to them.

(Demnum-Sa, Manufactured by Daikin Industries Ltd.)

(Krytox-Oh, manufactured by Dupont)

(Fomblin Z DOL 2000, manufactured by Solvay Solexis, molecular weight: approximately 2000)

m and n respectively represent polymerization degrees (Fomblin Z DOL TX, manufactured by Solvay Solexis, molecular weight: approximately 2100)

l, m and n respectively represent polymerization degrees (Fomblin Z TETRAOL, Manufactured by Solvay Solexis)

m and n respectively represent polymerization degrees

Specific examples of the fluorine-containing polyether compound (B) include those represented by the following chemical structural formula 1 or 2.

In the formula, l, m and n respectively represent polymerization degrees.

Further, specific examples of the fluorine-containing polyether compound (B) include the following compound.

l and m respectively represent polymerization degrees.

A compound into which the methacryloyl group is introduced via urethane bond by allowing methacryloyloxyethyl isocyanate (Karenz MOI, manufactured by SHOWA DENKO K.K.) to react with the terminal hydroxyl group of Fomblin Z DOL [alcohol modified perfluoropolyether (manufactured by Solvay Solexis).]

One kind of the fluorine-containing polyether compound (B) may be used, and two or more kinds thereof are used together.

The fluorine-containing polyether compound (B) in the active energy ray-curable resin composition of the present invention is preferably within a range of 0.01% by weight or more to 3% by weight or less, more preferably 0.05% by weight or more to 1.5% by weight or less, in 100% by weight of a nonvolatile components of the composition. Allowing the fluorine-containing polyether compound (B) to contain in a quantity more than 3% by weight improve the anti-staining property and lubricity but lower the hardness of the hard coat layer. On the other hand, allowing the fluorine-containing polyether compound (B) to contain in a quantity of less than 0.01% by weight cannot improve the anti-staining property and lubricity. The nonvolatile component is a component remaining in the hard coat layer after curing, including a compound (C) represented by a general formula (1), inorganic fine particles (D), photopolymerization initiator and optional components such as various additives, in addition to the fluorine-containing polyether compound (B) and the compound (A) having an active energy ray-curable unsaturated bond.

Further, a compound having no urethane bond in a molecule, namely, a compound having at least one perfluoropolyether unit and at least one active energy ray-curable unsaturated bond in a molecule, can be used instead of the compound (B) depending on the level of properties required, though it is not comparable in properties.

The compound (C) in the present invention is a compound represented by the general formula (1):

wherein R1, R2 and R3 are respectively an organic group having at least one functional group selected from a vinyl group, an epoxy group, a (meth)acryloxy group, an amino group and a mercapto group and may be either the same or different, and n is an integer of 0 or more. It preferably is a compound having a weight-average molecular weight of about 5,000 to about 800,000 in terms of polystyrene standards determined by GPC.

The organic group having at least one functional group selected from a vinyl group, an epoxy group, a (meth)acryloxy group, an amino group and a mercapto group is a group in which the functional group is bonded via an alkyl group or the like. The organic group also includes a group in which the functional group is bonded directly to silicon. The amino group includes not only primary amino group, but also secondary amino group. Examples of such organic groups include, besides a group directly bonded to silicon such as a vinyl group, a group bonded to silicon via an alkyl group such as a glycidoxypropyl group, a (meth)acryloylpropyl group, an aminopropyl group and a mercaptopropyl group, and an N-2-(aminoethyl)-3-aminopropyl group. In particular, preferable functional groups include a (meth)acryloxy group and a vinyl group.

The compound (C) contained in the active energy ray-curable resin composition of the present invention is a compound obtained by hydrolyzing a hydrolyzable silane compound having a functional group, and then polymerizing the product by a dehydration condensation reaction. By doing so, the compatibility of inorganic fine particles with the compound (A) having an active energy ray-curable unsaturated bond and a anti-staining property-imparting agent (B) having an active energy ray-curable unsaturated bond is increased drastically. As a result, if a hard coat layer is formed by using the active energy ray-curable resin composition on a supporting substrate, it will become possible to apply the composition uniformly without forming defects in a coating film, and a serious quality problem such as defective appearance and drop of reading accuracy will be solved.

The compound (C) contained in the active energy ray-curable resin composition of the present invention preferably is contained in an amount of 1% by weight to 10% by weight, and more preferably 5% by weight to 10% by weight in 100% by weight of nonvolatile components in the composition. If the compound (C) is contained in an amount less than 1% by weight, a sufficient effect is not obtained. On the other hand, if it is more than 10% by weight, it will cause decrease in strength of a coating film.

The inorganic fine particles (D) contained in the active energy ray-curable resin composition of the present invention are fine particles which are composed of at least one kind of fine particles selected from silica fine particles and fine particles of a metal oxide such as antimony oxide, tin oxide-doped indium oxide (ITO) or tin oxide-doped antimony oxide (ATO), and which have an average particle diameter of 5 to 100 nm as measured by a dynamic light scattering method. The inorganic fine particles (D) contained in the active energy ray-curable resin composition of the present invention preferably are contained in an amount of 20% by weight to 80% by weight in 100% by weight of nonvolatile components in the composition. One kind of these inorganic fine particles may be used, and two or more kinds thereof may be used in combination. As to these inorganic fine particles, fine particles having a surface modified with a hydrolyzable silane compound may be used.

The active energy ray-curable resin composition of the present invention preferably contains a photopolymerization initiator when curing is performed by use of ultraviolet rays or the like as an active energy ray. Examples of the photopolymerization initiator include benzoin methyl ether, benzoin ethyl ether, benzoin isopropyl ether, benzoin butyl ether, diethoxyacetophenone, benzyl dimethyl ketal, 2-hydroxy-2-methylpropiophenone, 1-hydroxycyclohexyl phenyl ketone, benzophenone, 2,4,6-trimethylbenzoyldiphenyl phosphine oxide, 2-chlorothioxanthone, and 2,4-diethylthio xanthone. Such photopolymerization initiators may be used either singly or as an appropriate combination of two or more kinds. The photopolymerization initiator may be used in combination with a photosensitizer such as amines, e.g. isoamyl N,N-dimethylaminobenzoate and triethanolamine. The blended amount of the photopolymerization initiator preferably is approximately from 0.1% by weight to 10% by weight with respect to the amount of nonvolatile components in the composition, and the amount of the photosensitizer preferably is approximately from 0.1% by weight to 5% by weight with respect to the amount of the nonvolatile components in the composition.

The active energy ray-curable resin composition of the present invention may contain a non-reactive organic solvent. Examples thereof include aromatic hydrocarbons such as toluene and xylene; esters such as ethyl acetate, n-propyl acetate, iso-propyl acetate, n-butyl acetate and iso-butyl acetate; alcohols such as methyl alcohol, ethyl alcohol, n-propyl alcohol, iso-propyl alcohol and n-butyl alcohol; ketones such as acetone, methyl ethyl ketone, methyl isobutyl ketone and cyclohexanone; ethers such as 2-methoxyethanol, 2-ethoxyethanol, 2-butoxyethanol, ethylene glycol dimethyl ether, ethylene glycol diethyl ether, diethylene glycol dimethyl ether and propylene glycol methyl ether; and ether esters such as 2-methoxyethyl acetate, 2-ethoxyethyl acetate, 2-butoxyethyl acetate and propylene glycol methyl ether acetate. Such organic solvents may be used either singly or as a mixture of two or more kinds. Such non-reactive organic solvents are used in order to impart moderate coating performance, fluidity or the like to an active energy ray-curable resin composition, and the blended amount thereof is properly adjusted within a range such that a desired coating performance or fluidity can be obtained. Moreover, additives such as UV absorbers, plasticizers, crosslinker, antioxidants, polymerization inhibitors and light stabilizers (HALS) may be used in the active energy ray-curable resin composition of the present invention unless the effect of the present invention is impaired.

Subsequently, a description is made on a laminate having a hard coat layer formed from the active energy ray-curable resin composition of the present invention by taking an optical information medium (henceforth, abbreviated as an optical disk) and a functional optical film as examples. First, an optical disk and a production method thereof are described in detail.

An optical disk of the present invention comprises a film element composed of one or more layers including at least a recording layer or a reflective layer, on a supporting substrate, wherein at least one of the supporting substrate-side surface and the film element-side surface is formed of a thin-film cover layer comprising a cured film of the active energy ray-curable resin composition. In the optical disk to which the present invention is applied, at least one of the supporting substrate-side surface and the film element-side surface, and preferably the surface upon which the recording/reproducing beam is incident, is formed of the thin-film cover layer comprising a cured film of the active energy ray-curable resin composition.

Figure 1:
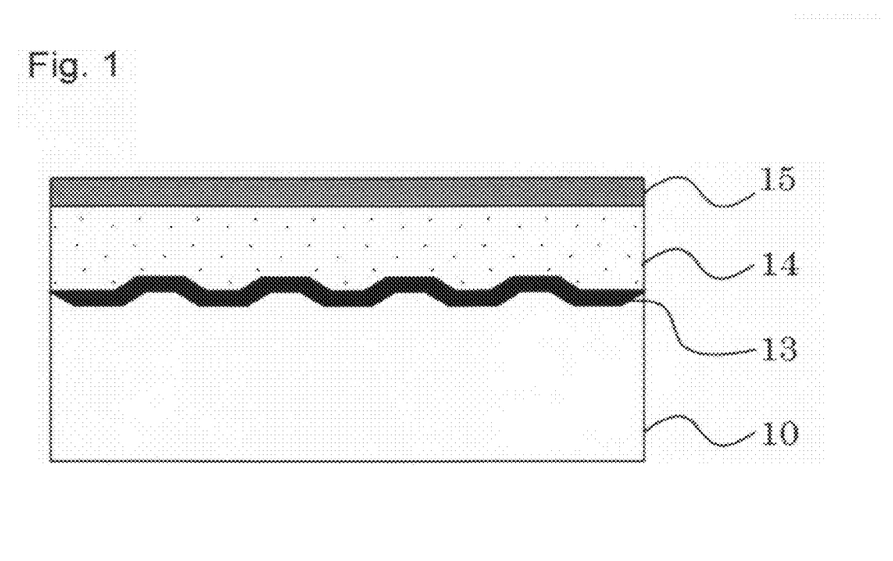
FIG. 1 is a schematic cross-sectional view that illustrates one example of the layer structure of an optical disk which is applied to the present invention and in which the film element-side surface acts as the surface upon which the recording/reproducing beam is incident.

1. Optical disk in which the film element-side surface acts as the surface upon which the recording/reproducing beam is incident:

An optical disk, in which the film element-side surface acts as the surface upon which the recording/reproducing beam is incident, will be described. FIG. 1 is a schematic cross-sectional view showing one example of the layer structure of an optical disk to which the present invention is applied. This optical disk is a recording medium, and comprises a recording layer (13) that functions as an information recording layer on a supporting substrate (10) of comparatively high rigidity, a light-transmitting layer (14) on the recording layer (13), and a light transmitting hard coat layer (15) on the light-transmitting layer (14). The hard coat layer (15) acts as the surface upon which the recording/reproducing beam is incident, and the laser beam for recording or reproducing is incident through the hard coat layer (15) and the light-transmitting layer (14), and onto the recording layer (13). The thickness of the light-transmitting layer (14), including the hard coat layer (15), is preferably within a range from 30 to 150 µm, and more preferably from 50 to 120 µm. An example of such an optical disk is the Blu-ray Disc. The hardness of the hard coat layer (15) side is at least grade B in a pencil hardness test.

Although not shown in the drawings, the present invention also includes optical disks with two or more recording layers, in which an additional recording layer is provided on the recording layer (13) through a spacer layer disposed therebetween. In such cases, the light-transmitting layer (14) and the hard coat layer (15) are formed on the recording layer positioned farthest from the supporting substrate (10).

The present invention can be applied to all different manner of recording layers. In other words, for example, the invention can be applied to phase-change type recording media, pit formation type recording media, and magneto-optical recording media. Normally, a dielectric layer or a reflective layer is provided on at least one side of the recording layer in order to protect the recording layer and provide an optical effect, but this layer has been omitted in FIG. 1. Furthermore, the present invention is not restricted to recordable type media such as that shown in the drawings, and can also be applied to read-only type media.

Figure 2:
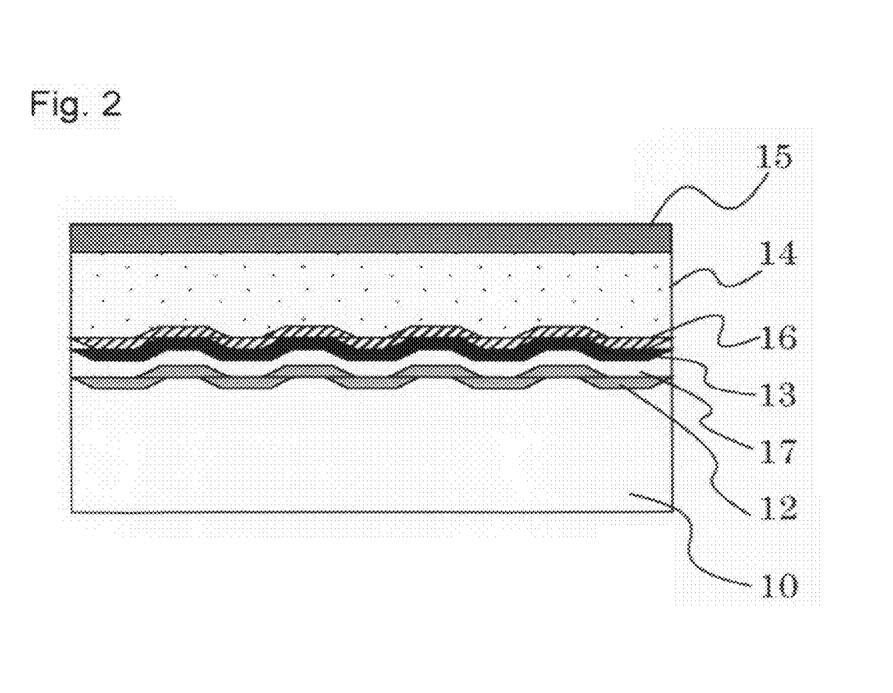
FIG. 2 is a schematic cross-sectional view that illustrates another example of the layer structure of an optical disk which is applied to the present invention and in which the film element-side surface acts as the surface upon which the recording/reproducing beam is incident.

FIG. 2 is a schematic cross-sectional view showing one example of the layer structure of a phase-change type optical recording disk to which the present invention is applied. In FIG. 2, an optical disk has a supporting substrate (10) having information pits, pregrooves, and other fine scale concavities-convexities formed on one surface thereof. On the surface of the supporting substrate (10), the optical disk has a desired film element formed as an information recording layer by the method such as a sputtering, and the light-transmitting layer (14) and the hard coat layer (15) formed on the film element. When using the optical disk, a laser light for recording or reproducing is incident through the hard coat layer (15) and the light transmitting layer (14), namely from the film element side. The supporting substrate (10) has a thickness of 0.3 to 1.6 mm, preferably of 0.5 to 1.3 mm, and includes information pits, pregrooves, and other fine scale concavities-convexities formed on the surface on which the phase-change recording material layer (13) is formed.

The supporting substrate (10) is not required to be optically transparent when the optical disk is used in such a manner that a laser light is incident through the film element side as described above. However, as transparent materials, various plastic materials including polycarbonate resins, acrylic resins such as polymethyl methacrylate (PMMA), and polyolefine resins and the like may be used. The supporting substrate (10) is produced by a method such as an injection molding.

On the supporting substrate (10), information recording layer may be obtained by forming the film element using the known materials and the known methods, depending on the purpose. As one example, a reflective layer (12) is formed by using an Ag type material to have a thickness of about 20 to 200 nm, on the reflective layer (12), a second dielectric layer (17) is formed by using a dielectric material to have a thickness of about 20 to 150 nm, a phase-change recording material layer (13) of SbTe type is formed to have a thickness of about 3 to 50 nm, and a first dielectric layer (16) is formed by using a dielectric material to have a thickness of about 20 to 200 nm, by a sputtering process respectively. The light transmitting layer (14) is formed on the information recording layer by using active energy ray-curable material, or light-transmitting sheet such as a polycarbonate sheet.

The active energy ray-curable material for the light transmitting layer (14) should be optically transparent, exhibit low optical absorption or reflection in the laser wavelength range to be used, and have low birefringence, and is selected from ultraviolet ray-curable materials and electron ray-curable materials on these conditions.

In the formation of the light-transmitting layer (14), the application of the active energy ray-curable material onto the surface of the first dielectric layer (16) is preferably conducted using a spin coating method. Following the application, the curable material may be cured by irradiation with ultraviolet rays. This ultraviolet-ray irradiation may be divided into a plurality of irradiation doses. Furthermore, the operation of applying the active energy ray-curable material may also be conducted using a plurality of application repetitions, with ultraviolet-ray irradiation conducted after each individual application repetition. By dividing the ultraviolet-ray irradiation operation into a plurality of irradiation doses, the resin is able to be cured in a stepwise manner, thus enabling a reduction in the stress that accumulates in the disk at any one time due to curing shrinkage, leading to a reduction in the overall stress accumulated in the disk. As a result, even if the thickness of the light-transmitting layer (14) is large, as in the case described above, a disk with excellent mechanical properties can still be produced.

Alternatively, in the present invention, a light-transmitting layer can also be formed using a light transmitting resin sheet. In such a case, the same active energy ray-curable material as the material for the light-transmitting layer is applied onto the first dielectric layer (16) to form an uncured resin material layer. A light transmitting sheet is then placed on the uncured resin material layer as the light-transmitting layer (14), and by subsequently irradiating with active energy rays such as ultraviolet rays and curing the uncured resin material layer, the light transmitting sheet is adhered so as to form the light-transmitting layer (14). The active energy ray-curable material used for this resin material layer preferably has a viscosity of 3 to 500 mPa·s (at 25° C.). Application of the resin material layer is preferably conducted using a spin coating method. After curing, the thickness of the resin material layer is, for example, within a range of about 1 to 50 µm.

As the light transmitting sheet, for example, a polycarbonate sheet with any desired thickness within a range from 30 to 150 µm is used. More specifically, the formation of the light-transmitting layer (14) involves placing the polycarbonate sheet of the desired thickness on the uncured resin material layer under vacuum conditions (0.1 atmospheres or lower), returning to atmospheric pressure, and then conducting irradiation with ultraviolet rays to cure the resin material layer.

A hard coat layer (15) is then formed on the light-transmitting layer (14) using the active energy ray-curable resin composition. In other words, the active energy ray-curable resin composition is applied onto the light-transmitting layer (14), thus forming an uncured hard coat layer, and the applied active energy ray-curable resin composition is then irradiated with active energy rays to crosslink and cure, thereby forming the hard coat layer (15).

The coating method for the application is not limited, and may be any one of various coating methods such as spin coating, dip coating and gravure coating methods. In an alternate method in which a light-transmitting sheet is used as the light-transmitting layer (14), the hard coat layer (15) is first formed, as described above, onto a raw light-transmitting sheet of continuous length, and disks are subsequently stamped out from the raw sheet. In the same manner as described above, the disks are placed on the uncured resin material layer and the uncured resin material layer is cured.

When the active energy ray-curable resin composition contains the organic solvent, the active energy ray-curable resin composition is applied to form an uncured hard coat layer, which is then dried by heating to remove the organic solvent. Subsequently, the active energy rays are irradiated to cure the uncured layer and to thereby form the hard coat layer (15). By applying the active energy ray-curable resin composition using the organic solvent and then removing the organic solvent by heating and drying, the fluorine-containing polyether compound (B) tends to concentrate in the proximity of the surface of the uncured hard coat layer. The result is more fluorine-containing polyether compound (B) existing in the proximity of the surface of the cured hard coat layer (15). This further enhances the lubricity. The heating/drying process is preferably carried out at a temperature of for example 40° C. or more and 100° C. or less, and over a time period of for example 30 seconds or more and 8 minutes or less, preferably 1 minute or more and 5 minutes or less, and more preferably 3 minutes or more and 5 minutes or less. The active energy rays may be properly selected from ultraviolet rays, electron rays, visible rays, and other proper active energy rays. Preferably, ultraviolet rays or electron rays are used. The thickness of the hard coat (15) after curing is about 0.1 to 50 µm, preferably 0.5 to 10 µm.

In this manner, a phase-change type optical recording disk such as that shown in FIG. 2 may be produced, which represents an example of an optical disk in which the film element-side surface acts as the surface upon which the recording/reproducing beam is incident.

Figure 3:
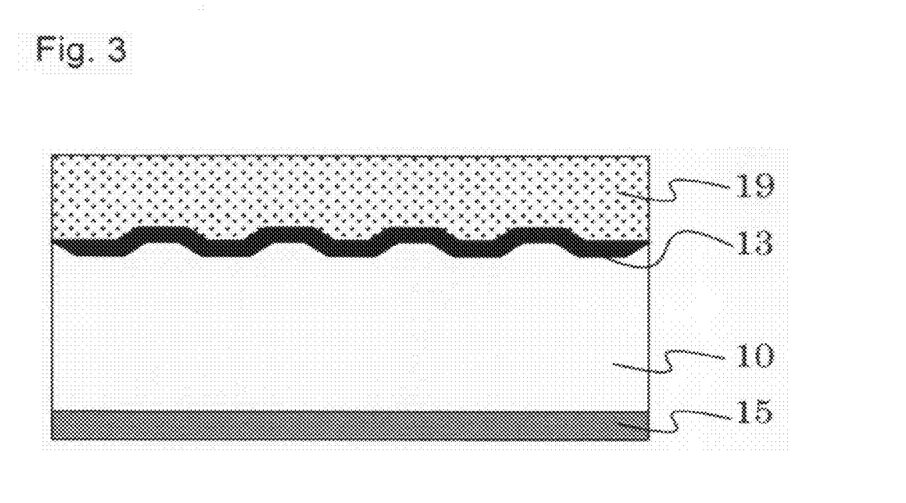
FIG. 3 is a schematic cross-sectional view that illustrates one example of the layer structure of an optical disk which is applied to the present invention and in which the supporting substrate-side surface acts as the surface upon which the recording/reproducing beam is incident.

2. Optical disk in which the supporting substrate-side surface acts as the surface upon which the recording/reproducing beam is incident:

An optical disk, in which the supporting substrate-side surface acts as the surface upon which the recording/reproducing beam is incident, will be described. FIG. 3 is a schematic cross-sectional view showing another example of the layer structure of an optical disk which is applied to the present invention. The optical disk shown in FIG. 3 comprises a recording layer (13) on one surface of a supporting substrate (10), and a protective layer (19) on the recording layer (13), whereas a hard coat layer (15) is formed on the other surface of the supporting substrate (10). The hard coat layer (15) acts as the side upon which the recording/reproducing beam is incident, and the laser beam for recording or reproducing is incident through the hard coat layer (15) and the supporting substrate (10), and onto the recording layer (13).

Figure 4:
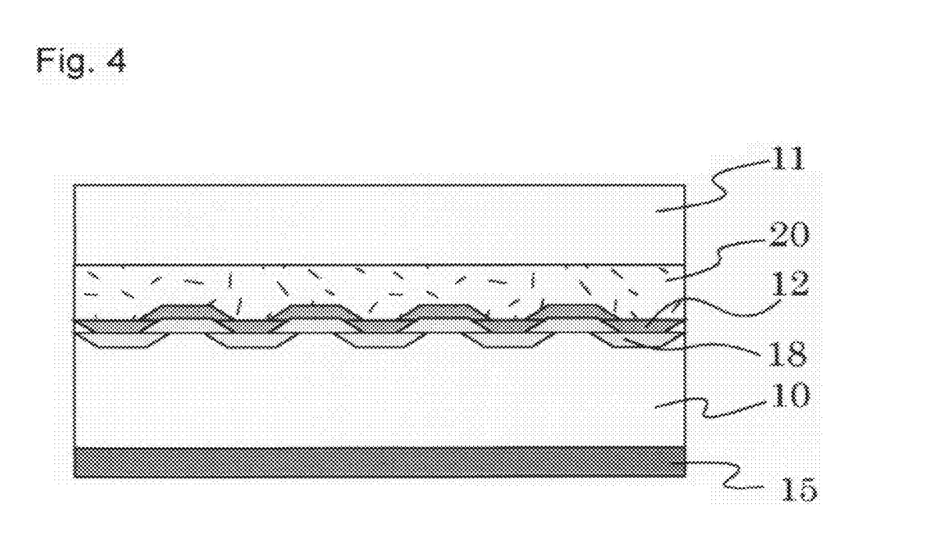
FIG. 4 is a schematic cross-sectional view that illustrates another example of the layer structure of an optical disk which is applied to the present invention and in which the supporting substrate-side surface acts as the surface upon which the recording/reproducing beam is incident.

FIG. 4 is a schematic cross-sectional view showing another example of the layer structure of an optical disk which is applied to the present invention. The optical disk shown in FIG. 4 comprises an information recording layer on one surface of a supporting substrate (10), and a second supporting substrate (11) that is laminated via a protective and adhesive layer (20) on the information recording layer, whereas a hard coat layer (15) is formed on the other surface of the supporting substrate (10). The hard coat layer (15) acts as the side upon which the recording/reproducing beam is incident. An example of this optical disk is the write-once DVD-R format wherein the information recording layer is composed of the organic dye layer (18) and the reflective layer (12).

In addition to the write-once DVD-R disk shown in FIG. 4, a variety of other disk formats, including read-only DVD-ROM, and rewritable formats such as DVD-RAM and DVD-RW and the like can be commercially available. Read-only DVD formats include DVD-Video, DVD-ROM, and the like.

In such an optical disk, a light transmitting substrate having a thickness of 0.6 mm is used as the supporting substrate (10). Conventionally, the supporting substrate (10) is formed by injection molding of a polycarbonate resin, with various information formed on the surface of the resin as a series of prepits or pregrooves. However, other materials may also be used, and resins such as polyolefin resins can also be favorably employed.

In the information recording layer of this example, using the desired dye depending on the purpose, a solution of the organic dye dissolved in a solvent is applied onto the supporting substrate (10) by a spin coating method, and is then dried to form an organic dye layer (18) of the desired thickness of about 10 to 300 nm.

Further, a reflective layer (12) of Ag type having a thickness of about 10 to 300 nm is provided on the organic dye layer (18) by sputtering or the like.

Usually, a supporting substrate (11) is laminated on the reflective layer (12) via a protective and adhesive layer (20) formed by a spin coating method and the like. The supporting substrate (11) can use the same material as that used for the supporting substrate (10). There are no particular restrictions on the material used for the protective and adhesive layer (20), provided it is capable of bonding the two substrates (10) and (11) together, and protects the reflective layer from external forces. However, the protective and adhesive layer (20) is formed by using the material such as an ultraviolet ray-curable adhesive by a screen printing method or a spin coating method.

On the other hand, a light transmitting hard coat layer (15) is formed on the other surface of the supporting substrate (10). The material for the hard coat layer (15), and the method used for forming the layer are as described above in the section 1. The hard coat layer (15) acts as the side upon which the recording/reproducing beam is incident.

In the manner described above, a DVD-R disk such as that shown in FIG. 4 may be produced, which represents an example of an optical disk in which the supporting substrate-side surface acts as the surface upon which the recording/reproducing beam is incident.

On the other hand, the functional optical film includes anti-reflection films and anti-glare films which are to be used on surfaces of liquid crystal displays, plasma displays, and the like. Such functional optical films are products obtained by forming a hard coat layer and various functions imparting-layer on a substrate surface to impart to the substrate an optical function such as prevention of surface reflection or prevention of background reflection.

The functional optical film in the present invention is a laminate in which a hard coat layer is formed on a surface of a polyester film or a triacetylcellulose film by using the active energy ray-curable resin composition of the present invention, or a laminate in which a function-imparting layer of the active energy ray-curable resin composition of the present invention is formed via a hard coat layer.

While the substrate for the functional optical film includes a plastic film and glass, a plastic film is preferably used because of its high transparency and in view of cost and ease of handling. Specific examples include films formed of a polyester resin, an acrylic resin, a triacetylcellulose resin, a polyethylene resin, a polypropylene resin, a polyolefin resin, a polycycloolefin resin, a polyvinyl chloride resin, a polycarbonate resin, a phenolic resin, and a urethane resin. From the viewpoint of physical properties, optical properties, chemical resistance, environmental load, and the like, a polyester-based film is preferred. More specifically, a polyethylene terephthalate film (PET film) is preferred. As the substrate, a so-called "easy adhesion film" in which a resin layer of an acrylic resin, a copolymerized polyester resin, a polyurethane resin, a styrene-maleic acid-graft polyester resin, an acrylic-graft polyester resin, or the like is provided on a polyester-based film may also be used.

The active energy ray-curable resin composition of the present invention can be applied by various methods such as bar coating, blade coating, spin coating, reverse coating, die coating, spray coating, roll coating, gravure coating, lip coating, air-knife coating and dipping. A drying step may be carried out optionally depending upon whether a solvent exists or not.

A cured film of the active energy ray-curable resin composition of the present invention can be formed by crosslink-curing an applied hard coat agent by irradiation with an active energy ray. As the active energy ray, ultraviolet rays emitted from a light source such as a xenon lamp, a low-pressure mercury lamp, a high-pressure mercury lamp, an ultrahigh-pressure mercury lamp, a metal halide lamp, a carbon arc lamp, a tungsten lamp, or the like, or electron beams, α-rays, β-rays, γ-rays, or the like usually taken out from an electron beam accelerator of 20 to 2000 KeV can be used. A hard coat layer formed in such a manner usually is adjusted to be 0.1 to 50 μm, and preferably 0.5 to 10 μm in thickness.

When the active energy ray-curable resin composition contains a non-reactive organic solvent, a hard coat layer can be obtained by the following procedure: applying the active energy ray-curable resin composition to form an uncured hard coat layer, then removing the non-reactive organic solvent by heat-drying, and thereafter conducting irradiation of an active energy ray to cure the uncured layer.

EXAMPLES

The present invention will be described concretely below by way of examples and comparative examples, but the invention is not limited to the examples. All part(s) and % are by weight unless otherwise stated. The property of the active energy ray-curable resin compositions shown in the examples and comparative examples was evaluated by the methods shown below, and the results thereof are shown in Table 3 and Table 4.

Production of a Coated Article

Property evaluation was performed using a substrate for optical disks with a layer structure shown below, or a PET film (polyester film manufactured by Toyobo Co., Ltd., E5100). In other words, using a disk shaped supporting substrate (formed from polycarbonate, diameter 120 mm, thickness 1.1 mm) in which information recording grooves had been formed, sputtering was used to form a reflective layer of thickness 100 nm comprising $Al_{98}Pd_1Cu_1$ (atomic ratio) on the groove-side surface of the substrate. The depth of the grooves, which is represented by light-path length at a wavelength λ=405 nm, was set into λ/6. The recording track pitch in the groove-recording scheme was set into 0.32 μm.

Subsequently, sputtering with an $Al_2O_3$ target was used to form a second dielectric layer of thickness 20 nm on the surface of the reflective layer. Sputtering using an alloy target comprising a phase-changing material was then used to form a recording layer of thickness 12 nm on the surface of the second dielectric layer. The composition (atomic ratio) of the recording layer was $Sb_{74}Te_{18}(Ge_7In_1)$. Sputtering with a ZnS (80 mol %)-$SiO_2$ (20 mol %) target was then used to form a first dielectric layer of thickness 130 nm on the surface of the recording layer.

Subsequently, active energy ray-curable resin with the composition shown below was applied onto the surface of the first dielectric layer by a spin coating method, and was then irradiated with ultraviolet rays under conditions including an irradiation intensity of 160 W/cm, and an integrated light quantity of 3 $J/cm^2$, thus forming a light transmitting layer with a cured thickness of 98 μm. The resulting optical disk substrate sample was used.

| | |
|---|---|
| Urethane acrylate (Compound obtained by acrylating polytetramethylene glycol (molecular weight: 600, produced by Wako Pure Chemical Industries, Ltd.) at both terminals with hydrogenated MDI and 2-hydroxyethyl acrylate) | 75 parts by weight |
| Tetrahydrofurfuryl acrylate | 25 parts by weight |
| Irgacure 184 | 3 parts by weight |

Polymerization Initiator, Produced by Ciba Specialty Chemicals

As to the PET film, a commercially available product was used as received as a sample.

Subsequently, a hard coat layer was formed by applying the active energy ray-curable resin composition of the present invention to each of the samples. The application was carried out by spin coating for a optical disk substrate, and by bar coating for a PET film. Then, the solvent was removed using a hot-air drying oven, followed by ultraviolet ray irradiation at an irradiation intensity of 160 W/cm and an integrated light quantity of 3 $J/cm^2$, yielding a coated article having a thickness of about 2 μm. The resulting coated articles were evaluated as follows.

Haze Value

Haze values were measured according to JIS K 7136 using HM-65W manufactured by Murakami Color Research Laboratory.

Abrasion Resistance

In accordance with JIS K 5600-5-9, abrasion resistance was evaluated using a Taber abrasion tester manufactured by Toyo Seiki Seisaku-sho, Ltd. An truck wheel CS-10F was used. In the evaluation, a haze value was measured before and after the test, and judgment was made on a scale of 1 to 5 on the basis of the haze value difference between the measurements. The judgment criteria range from 5 (excellent) to 1 (poor) as follows.

5: The haze value difference is less than 5%.
4: The haze value difference is 6% to 10% inclusive.
3: The haze value difference is 11% to 15% inclusive.
2: The haze value difference is 16% to 20% inclusive.
1: The haze value difference is more than 20%.

Surface Resistivity

The measurement of the resistivity of a coating surface was carried out using a HIRESTA UP whose probe was a URS probe, manufactured by Mitsubishi Chemical. The measurement atmosphere was 25° C., and 50% RH.

Adhesion

On a coated surface of a sample, a checkered cut pattern at about 1 mm intervals was formed with a sharp cutting edge of a cutter. The checkered pattern had cells of 10 columns and 10 lines. A Cellotape (registered trademark) produced by Nichiban Co., Ltd. was applied thereto. Then, it was forcefully peeled off and the surface condition at this time was observed. The evaluation was performed on the basis of the number of cells where a coating film remained without being peeled among 10×10=100 cells.

Error Rate

Information was recorded on a sample using an optical recording medium evaluation unit (ODU-1000, manufactured by Pulstec Industrial Co., Ltd., wavelength λ=405 nm, NA=0.85) under the following conditions. Then, the bit-by-bit error rate (bER) was measured. Judgment was made using $1 \times 10^{-5}$ as a threshold. That is, an error rate of less than $1 \times 10^{-5}$ was judged as "good", and an error rate of $1 \times 10^{-5}$ or more was judged as "not good".

Recording Conditions
Modulation system: 1-7PP
Recording line speed: 4.92 m/s
Channel clock: 66 MHz
Data transfer rate: 36 Mbps Pure Water Contact Angle A fixed amount of pure water was dropped on a coated surface of a sample, and then the contact angle relative to the substrate interface was measured at a temperature of 20° C. and a relative humidity of 60%. The measurement was carried out using a contact angle analyzer (FACE CONTACT-ANGLEMETER) manufactured by Kyowa Interface Science Co., Ltd.

Condition of Coated Surface

A coated surface of a sample was visually observed and judgment was made on a scale of 1 to 5. The coated conditions are surface conditions per one disk for disks, and surface conditions per an area of $10 \times 10$ cm$^2$ for PET films. The evaluation criteria range from 5 (excellent) to 1 (poor) as follows.

5: Condition where no cissing, no agglomerate and no uneven coating is observed.
4: Condition where cissing, agglomerate and/or uneven coating are found at 1 or 2 points.
3: Condition where cissing, agglomerate and/or uneven coating are found at 5 to 8 points.
2: Condition where cissing, agglomerate and/or uneven coating are found at 10 to 15 points.
1: Condition where cissing, agglomerate and/or uneven coating are found at 20 to 30 points.

In preparing an active energy ray-curable resin composition, first, a siloxane condensate (compound (C)) represented by the general formula (1) was synthesized as follows.

Synthesis Example 1

Into a four-necked flask equipped with a cooling tube, a stirrer and a thermometer, 500 g of propylene glycol monomethyl ether, 180 g of a hydrolyzable silane compound and 18 g of water were charged. The mixture was heated up to 80° C. while being stirred under a nitrogen flow. A polymerization reaction was carried out at that temperature for two hours to yield a solution of compound (I).

Like the above-mentioned synthesis example, compound (I)-1 to compound (I)-5 were obtained using the hydrolyzable silane compounds shown in Table 1.

TABLE 1

| | Hydrolyzable silane compound | Molecular weight |
|---|---|---|
| (1)-1 | 3-methacryloxypropyltrimethoxysilane | 576,000 |
| (1)-2 | 3-acryloxypropyltrimethoxysilane | 350,000 |
| (1)-3 | vinyltriethoxysilane | 53,000 |
| (1)-4 | aminopropyltriethoxysilane | 175,000 |
| (1)-5 | mercaptopropyltrimethoxysilane | 10,000 |

Anti-staining property-imparting agents (B) were synthesized as follows.

Synthesis Example 2-1

Into a four-necked flask equipped with a cooling tube, a stirrer and a thermometer, 210 g of perfluoropolyether diol (Fomblin Z DOL TX1000 produced by Solvay Solexis) was charged. It was heated up to 70° C. while being stirred under a nitrogen flow, and then isophorone diisocyanate (85.0 ml, 0.40 mol) and dibutyltin dilaurate (0.2 g) were added slowly. Stirring was continued for 4 hours while the temperature was kept at 70° C. Then, dibutylhydroxytoluene (0.25 g) and 49.0 g of 2-hydroxyethyl acrylate (HEA produced by OSAKA ORGANIC CHEMICAL INDUSTRY, LTD.) were added to the reaction mixture, and the reaction was further continued for 4 hours. In this way, a fluorine-containing polyether compound (B) represented by the chemical structural formula 1 was obtained.

Synthesis Example 2-2

Into a four-necked flask equipped with a cooling tube, a stirrer and a thermometer, 210 g of perfluoropolyether diol (Fomblin Z DOL TX1000 produced by Solvay Solexis) was charged. It was heated up to 70° C. while being stirred under a nitrogen flow, and then isophorone diisocyanate (85.0 ml, 0.40 mol) and dibutyltin dilaurate (0.2 g) were added slowly. Stirring was continued for 4 hours while the temperature was kept at 70° C. Then, dibutylhydroxytoluene (0.25 g) and 239.5 g of pentaerythritol triacrylate (PET-30, produced by Nippon Kayaku Co., Ltd.) were added to the reaction mixture, and the reaction was further continued for 4 hours. In this way, a fluorine-containing polyether compound (B) represented by the chemical structural formula 2 was obtained.

Examples 1 to 8 and Comparative Examples 1 to 3

Subsequently, as examples (Example 1 to Example 8) and comparative examples (Comparative Example 1 to Comparative Example 3), hard coat agent formulation liquids were prepared with the compositions shown in Table 2 and then coated articles were prepared. Thereafter, property evaluations were performed. For optical disks and functional optical films, evaluation results are shown in Tables 3 and 4 respectively.

TABLE 2

|  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| DPHA | 7 | 7 | 7 | 7 | 7 | 10 | 10 | 10 | 7 | 7 | 10 |
| TMPTA | 7.3 | 7.3 | 7.3 | 7.3 | 7.3 | — | — | — | 7.3 | 7.3 | — |
| M-220 | — | — | — | — | — | 4.8 | 4.8 | 4.8 | — | — | 4.8 |
| EB8804 | 3 | 3 | 3 | 3 | 3 | 2.5 | 2.5 | 2.5 | 3 | 3 | 2.5 |
| ELCOM | 50 | 50 | 50 | 50 | 50 | — | — | — | 50 | 50 | — |
| PMA-ST | — | — | — | — | — | 50 | 50 | 50 | — | — | 50 |
| Anti-staining property-imparting agent 1 | 0.3 | 0.3 | 0.3 | 0.3 | 0.3 | — | — | — | 0.3 | 0.3 | — |
| Anti-staining property-imparting agent 2 | — | — | — | — | — | 0.3 | 0.3 | 0.3 | — | — | 0.3 |
| (1)-1 | 13.2 | — | — | — | — | 13.2 | — | — | — | — | — |
| (1)-2 | — | 13.2 | — | — | — | — | 13.2 | — | — | — | — |
| (1)-3 | — | — | 13.2 | — | — | — | — | 13.2 | — | — | — |
| (1)-4 | — | — | — | 13.2 | — | — | — | — | — | — | — |
| (1)-5 | — | — | — | — | 13.2 | — | — | — | — | — | — |
| KBM-503 | — | — | — | — | — | — | — | — | — | 4 | — |
| KBM-5103 | — | — | — | — | — | — | — | — | — | — | 4 |
| Irg.184 | 2 | 2 | 2 | 2 | 2 | 2 | 2 | 2 | 2 | 2 | 2 |
| PGME | 17.2 | 17.2 | 17.2 | 17.2 | 17.2 | — | — | — | 30.4 | 26.4 | — |
| PGMEA | — | — | — | — | — | 17.2 | 17.2 | 17.2 | — | — | 26.4 |

The components used in Table 2 are as follows.
DPHA commercial name: KAYARAD DPHA (dipentaerythritol hexaacrylate) manufactured by Nippon Kayaku Co., Ltd.
TMPTA commercial name: Ebecryl TMPTA (trimethylolpropane triacrylate) manufactured by Daicel Cytec Co., Ltd.
M-220 commercial name: ARONIX M-220 (tripropylene glycol diacrylate) manufactured by Toagosei Co., Ltd.
EB8804 commercial name: Ebecryl 8804 (urethane acrylate, the number of functional groups: 2, molecular weight: 1300) manufactured by Daicel Cytec Co., Ltd.
ELCOM antimony pentoxide sol, manufactured by Catalysts & Chemicals Industries Co., Ltd., commercial name: ELCOM, particle diameter: 25 nm (solid content: 30%)
PMA-ST organosilica sol, manufactured by Nissan Chemical Industries, Ltd., commercial name: PMA-ST, particle diameter: 10 to 20 nm (solid content: 30%)
Anti-Staining Property-Imparting Agent-1
  fluorine-containing polyether compound (B) represented by the chemical structural formula 1
Anti-Staining Property-Imparting Agent-2
  fluorine-containing polyether compound (B) represented by the chemical structural formula 2
KBM-503 3-methacryloxypropyltrimethoxysilane manufactured by Shin-Etsu Chemical Co., Ltd.
KBM-5103 3-acryloxypropyltrimethoxysilane manufactured by Shin-Etsu Chemical Co., Ltd.
Irg. 184 photo initiator Irgacure 184 (1-hydroxycyclohexylphenyl ketone) manufactured by Ciba Specialty Chemicals
PGME non-reactive solvent, propylene glycol monomethyl ether
PGMEA non-reactive solvent, propylene glycol monomethyl ether acetate

TABLE 3

|  | Abrasion resistance | Surface resistivity (Ω/sq.) | Adhesion | Error rate | Contact angle (degree) | Condition of coated surface |
|---|---|---|---|---|---|---|
| Example 1 | 4 | $2.9 \times 10^{11}$ | 100/100 | good | 112 | 5 |
| Example 2 | 4 | $1.3 \times 10^{11}$ | 100/100 | good | 113 | 5 |
| Example 3 | 4 | $4.7 \times 10^{11}$ | 100/100 | good | 110 | 5 |
| Example 4 | 4 | $2.1 \times 10^{11}$ | 100/100 | good | 111 | 5 |
| Example 5 | 4 | $1.5 \times 10^{11}$ | 100/100 | good | 112 | 5 |
| Example 6 | 5 | $\geqq 1 \times 10^{14}$ | 100/100 | good | 111 | 5 |
| Example 7 | 5 | $\geqq 1 \times 10^{14}$ | 100/100 | good | 112 | 5 |
| Example 8 | 5 | $\geqq 1 \times 10^{14}$ | 100/100 | good | 111 | 5 |
| Comparative Example 1 | 4 | $3.5 \times 10^{11}$ | 100/100 | not good | 107 | 1 |
| Comparative Example 2 | 4 | $1.6 \times 10^{12}$ | 100/100 | not good | 105 | 2 |
| Comparative Example 3 | 5 | $\geqq 1 \times 10^{14}$ | 100/100 | not good | 104 | 2 |

TABLE 4

|  | Abrasion resistance | Haze value | Adhesion | Condition of coated surface |
|---|---|---|---|---|
| Example 1 | 5 | 0.5 | 80/100 | 5 |
| Example 2 | 4 | 0.5 | 80/100 | 5 |
| Example 3 | 4 | 0.5 | 80/100 | 5 |
| Example 4 | 4 | 0.5 | 80/100 | 5 |
| Example 5 | 4 | 0.5 | 80/100 | 5 |
| Example 6 | 5 | 0.7 | 80/100 | 5 |
| Example 7 | 5 | 0.7 | 80/100 | 5 |
| Example 8 | 5 | 0.7 | 80/100 | 5 |
| Comparative Example 1 | 5 | 1.0 | 80/100 | 1 |
| Comparative Example 2 | 4 | 1.0 | 80/100 | 1 |
| Comparative Example 3 | 5 | 1.0 | 80/100 | 1 |

According to the above, among the optical disks, those containing compound (1) are better in coated surface conditions than those containing no compound (1). Furthermore, because of the influence thereof, the disks containing compound (1) show excellent value in error rate and contact angle than those containing no compound (1). As to the functional optical films, it is shown that addition of compound (1) improves the coated surface conditions without causing deterioration of abrasion resistance or adhesion.

What is claimed is:

1. An active energy ray-curable resin composition comprising:
    a compound (A) having an active energy ray-curable unsaturated bond in a molecule,
    a anti-staining property-imparting agent (B) which is a fluorine-containing polyether compound having a perfluoropolyether unit, a urethane bond and an active energy ray-curable unsaturated bond in a molecule,
    a compound (C) represented by the general formula (I);

wherein R1, R2 and R3 may be either the same or different, and are respectively an organic group having at least one functional group selected from the group consisting of a vinyl group, a (meth) acryloxy group, an amino group and a mercapto group, and n is an integer of 0 or more, and
    inorganic fine particles (D),
    wherein the anti-staining property-imparting agent (B) is contained in an amount of 0.01% by weight to 3% by weight of nonvolatile components in the active energy ray-curable resin composition.

2. The active energy ray-curable resin composition according to claim 1, wherein the compound (C) has a weight-average molecular weight of 5,000 to 800,000 in terms of polystyrene, determined by Gel Permeation Chromatography.

3. The active energy ray-curable resin composition according to claim 1, wherein the compound (C) is contained in an amount of 1% by weight to 10% by weight in 100% by weight of nonvolatile components in the active energy ray-curable resin composition.

4. The active energy ray-curable resin composition according to claim 1, wherein the inorganic fine particles (D) are at least one kind of fine particles selected from the group consisting of metal oxide fine particles containing at least one element selected from the group consisting of antimony, indium and tin, and silica fine particles.

5. The active energy ray-curable resin composition according to claim 1, wherein the inorganic fine particles (D) have an average particle diameter of from 5 nm to 100 nm as measured by a dynamic light scattering method, and are contained in an amount of 20% by weight to 80% by weight in 100% by weight of nonvolatile components in the active energy ray-curable resin composition.

6. A laminate comprising:
    a supporting substrate; and
    a hard coat layer formed from the active energy ray-curable resin composition according to claim 1, on the supporting substrate.

* * * * *